No. 683,632. Patented Oct. 1, 1901.
N. G. WRIGHT.
SCRAP BOOK.
(Application filed May 27, 1901.)
(No Model.)
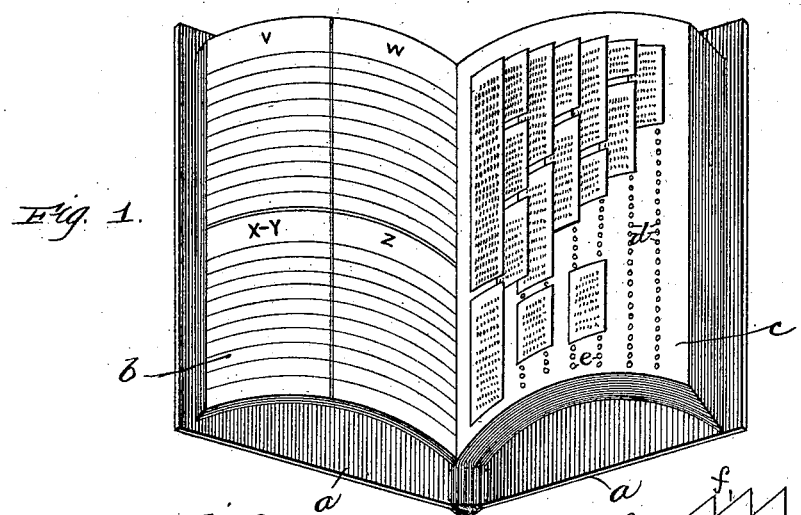
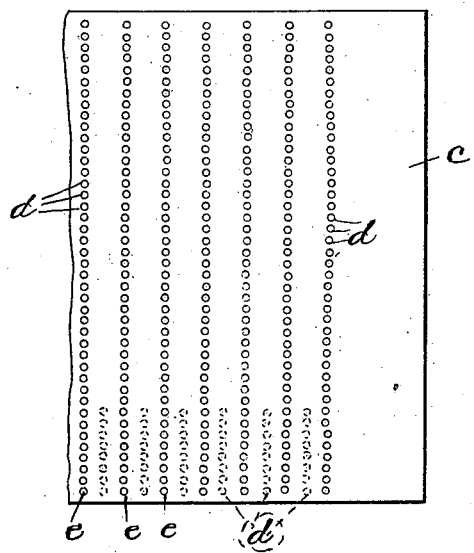
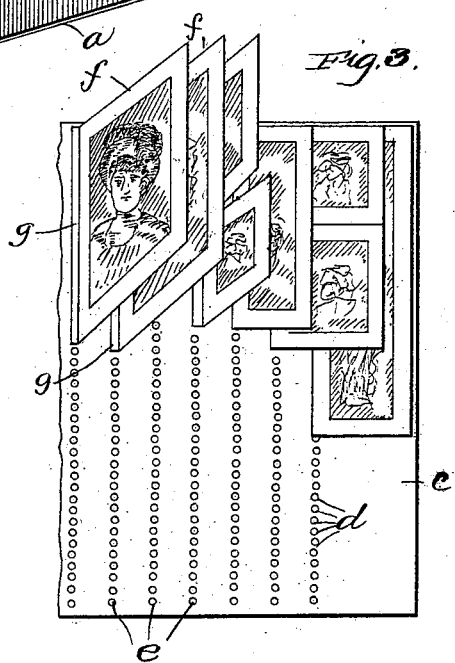
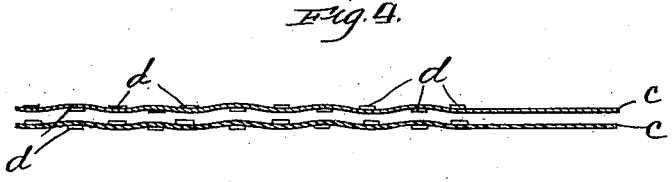
Witnesses:
Ray White
Harry R. White
Inventor:
Newton G. Wright.
By Willes M. Hill
Atty

UNITED STATES PATENT OFFICE.

NEWTON G. WRIGHT, OF CHICAGO, ILLINOIS.

SCRAP-BOOK.

SPECIFICATION forming part of Letters Patent No. 683,632, dated October 1, 1901.

Application filed May 27, 1901. Serial No. 62,008. (No model.)

*To all whom it may concern:*

Be it known that I, NEWTON G. WRIGHT, a citizen of the United States, residing in the city of Chicago, county of Cook, and State of Illinois, have invented a new and useful Improvement in Scrap-Books, of which the following is a specification.

My invention relates to scrap-books wherein newspaper-clippings, loose sheets, and the like can be secured.

As commonly constructed, scrap-books are provided with leaves which have spread upon portions of their surfaces gum or other suitable adhesive, by which the clippings are caused to adhere to the leaves of the book.

A frequent source of inconvenience in existing forms of scrap-books lies in the fact that after having been closed for a period of time, especially during hot or damp weather, the leaves of the book are apt to adhere one to another, thereby rendering the book, to a great extent, useless.

The object of my present invention is to so arrange the gummed surfaces upon the leaves that the danger of the adhesion of the leaves is avoided.

It is also my object to provide certain details of construction hereinafter set forth.

The embodiment of my invention is shown in the accompanying drawings, in which—

Figure 1 is a perspective view of the scrap-book in an open position, showing one of the gummed leaves partially filled with clippings. The opposite leaf shows an index-page. Fig. 2 shows a portion of one of the gummed leaves and illustrates the arrangement of the gummed surfaces thereon. Fig. 3 shows a portion of one of the leaves with clippings attached thereto. Fig. 4 is a transverse sectional view of leaves drawn to enlarged scale and showing the corrugations produced therein as the result of the application of the gum thereto.

Similar letters refer to similar parts throughout the several views.

$a\ a$ represent the covers of the book, which may be of any suitable pattern. Referring to Fig. 1, the leaves $b$ at the left are without gum and ruled for indexing. The leaves $c$ (shown at the right) have upon their surfaces a series of gummed areas, some of which are marked $d$. Considering the upper surface of the page shown in Fig. 2, the said gum areas $d$ are arranged in vertical rows or columns $e\ e$, placed, preferably, equidistant from each other across the page. By preference the said gummed areas $d$ are circular in contour and placed in such a manner that a slight distance is interposed between in two adjacent gummed areas in any specified line or column. The diameter of each gummed area is desirably small, a suitable diameter, for example, being five thirty-seconds of an inch. The purpose in having a gummed area of small diameter and arranging the areas in vertical rows or columns is to render it possible to attach a clipping to the page in such a manner that but a small strip of the clipping adheres to the page, with the result that both the upper and lower faces of the clipping may be exposed. This point is illustrated in Fig. 3, wherein $f\ f$ represent clippings which are secured to the book along the edges $g\ g$. Said edges act as hinges upon which the clippings $f\ f$ may revolve, and being of narrow width admit of the clippings being revolved so as to expose both the front and rear surfaces thereof.

In my form of book the gummed areas are placed upon both surfaces of the leaves $c$ and are arranged in a peculiar manner—to wit, alternately—that is to say, in such a manner that the rows or columns on the reverse surface of the leaf shall lie intermediately of the rows or columns on the obverse surface thereof. This arrangement is best illustrated in Fig. 4 and also in Fig. 2, in said Fig. 2 some of the gummed areas on the reverse surface of the leaf being indicated in dotted circles. The purpose of this arrangement is twofold, as will hereinafter appear.

It is a fact proven by experiment that the application of gum to the leaf in a row of areas, as described, causes the leaf to buckle or draw, with the result that such row occupies a depressed channel upon the leaf. It is my understanding that the cause of such channeling or buckling of the leaf is due to the circumstance that in applying the gum in the manufacture of the book the leaf is substantially dry, while the gum contains considerable moisture. The paper composing the leaf rapidly absorbs some of this moisture, and consequently swells and spreads laterally to an appreciable extent. The subsequent drying causes the gum to contract, and being of greater strength comparatively than the paper draws said paper together, so that when both are thoroughly dry said paper remains in this drawn or channeled condition. The application of the gum to both the obverse and reverse side of the leaf in alternating rows results in a corrugating of the leaf, as clearly shown in Fig. 4, the gummed areas occupying the depressions. Consequently there is afforded protection to the clipping or other insert at the point of attachment thereof to the leaf. Another effect of the corrugation of the leaves c lies in the fact that when the book is closed the leaves do not lie closely together, as they would do if flat. This is important in a gummed scrap-book, for it is of vital importance that the leaves shall not approach each other closely enough to adhere one to another.

In my form of scrap-book the leaves are bound in such a manner that when the book is closed the columns of gummed areas on one leaf lie intermediate of the columns of gummed areas upon the adjacent leaf. In other words, a gummed area on one leaf can never come opposite to or into contact with a gummed area upon another of the leaves of the book. This offsetting is illustrated by the relative positions of the two leaves shown in Fig. 4. As a result of the above-described construction there is no danger of the book becoming inoperative by reason of the sticking together of the leaves, and the use of tissue-paper separators and similar precautionary devices is rendered unnecessary.

Although I have shown the rows of gummed areas extending vertically from top to bottom of the page, it is evident that the rows may with the same result extend horizontally across the page—that is to say, in a direction parallel to the top and bottom edges of the page.

What I claim as new, and desire to secure by Letters Patent, is—

1. A scrap-book having gummed areas arranged in rows alternately placed on opposite surfaces of the leaves substantially as specified.

2. A scrap-book having gummed areas arranged in vertical rows on both surfaces of the leaves, said leaves being bound symmetrically, the rows of gummed areas upon adjacent surfaces of the leaves, when the book is closed, thereby alternating one with another.

3. A scrap-book having an adhesive upon both of the surfaces of the leaves, said surfaces extending intermittently in vertical columns, the columns on the obverse side of a leaf lying between the columns on the reverse side thereof thereby corrugating the said leaves; and the columns upon one leaf lying at distances from the back or hinge of the book unequal to the distances of the columns on the opposite leaf, said columns thereby being non-adjacent when the book is closed, substantially in the manner and for the purpose specified.

NEWTON G. WRIGHT.

Witnesses:
ARTHUR M. COX,
HOWARD M. COX.